United States Patent
Kawabata

(10) Patent No.: US 9,122,892 B2
(45) Date of Patent: Sep. 1, 2015

(54) PROTECTION DEVICE, PROTECTION SOFTWARE, AND PROTECTION METHOD FOR CONTROLLING EXTERNAL DEVICE

(75) Inventor: Yuichi Kawabata, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 231 days.

(21) Appl. No.: 13/473,978

(22) Filed: May 17, 2012

(65) Prior Publication Data

US 2012/0311701 A1 Dec. 6, 2012

(30) Foreign Application Priority Data

May 30, 2011 (JP) ................. 2011-120911

(51) Int. Cl.
  G06F 7/04      (2006.01)
  G06F 21/71     (2013.01)
  G06F 21/62     (2013.01)
  G06F 21/30     (2013.01)

(52) U.S. Cl.
  CPC .............. G06F 21/71 (2013.01); G06F 21/62 (2013.01); G06F 21/30 (2013.01); G06F 2221/2105 (2013.01)

(58) Field of Classification Search
  CPC ....... G06F 21/30; G06F 21/305; G06F 21/31; G06F 21/335; G06F 21/62; G06F 21/6218; G06F 21/10; G06F 2221/2141; H04L 63/08; H04L 63/083; H04L 63/10; H04L 2463/101; H04L 63/102; H04L 63/0428; H04L 63/12; G11B 20/00086; H04N 2201/0094; H04N 1/00344; H04N 1/00779; H04N 1/00954
  USPC ...................... 726/27–30, 2, 7, 16, 19, 21, 17
  See application file for complete search history.

(56) References Cited

U.S. PATENT DOCUMENTS

| | | | |
|---|---|---|---|
| 5,923,841 A * | 7/1999 | Lee ................................ 726/19 |
| 8,473,597 B2 * | 6/2013 | Igarashi et al. ............... 709/223 |
| 8,610,918 B2 * | 12/2013 | Kaneko ........................ 358/1.15 |
| 2004/0203601 A1 * | 10/2004 | Morriss et al. ............... 455/411 |
| 2005/0244170 A1 * | 11/2005 | Ono et al. ....................... 399/12 |
| 2006/0067722 A1 * | 3/2006 | Toyoda et al. .................. 399/80 |
| 2011/0145906 A1 * | 6/2011 | Morita et al. ..................... 726/7 |

FOREIGN PATENT DOCUMENTS

| | | |
|---|---|---|
| JP | 2006-163924 A | 6/2006 |
| JP | 2008-148159 | 6/2008 |

OTHER PUBLICATIONS

Japan Office action in Japan Patent Application No. 2011-120911, dated Dec. 2, 2014 along with an english translation thereof.

* cited by examiner

*Primary Examiner* — Nirav B Patel
(74) *Attorney, Agent, or Firm* — Greenblum & Bernstein, P.L.C.

(57) ABSTRACT

A protection device controlling an external device is provided having a mode detector, security data, a data detector, and a controller. The external device operates with operation modes that include a user mode that is used when the external device is operated by a user, and a manufacturer mode that is used when the external device is operated by someone other than the user. The mode detector detects an operation mode of the external device. The security data is input to the protection device. The data detector detects input of the security data. The controller restricts certain functions of the external device when the data detector does not detect input of the security data while the external device is in the manufacturer mode.

12 Claims, 3 Drawing Sheets

PROTECTION DEVICE, PROTECTION SOFTWARE, AND PROTECTION METHOD FOR CONTROLLING EXTERNAL DEVICE

BACKGROUND OF THE INVENTION

1. Field of the Invention

The present invention relates to a protection device, protection software, and a protection method for controlling an external device.

2. Description of the Related Art

Japanese Unexamined Patent Publication (KOKAI) No. 2006-163924 discloses a photograph processing device that operates based on a pre-installed program. The photograph processing device detects whether a certain access port is properly connected to a dongle that corresponds to software when its power is on, and then operates without any restrictions placed on the software's functions when the certain access port is properly connected to the dongle. Otherwise, the certain access port is not connected to a dongle and the photograph processing device operates with restrictions placed on its software's functions when the certain access port is not connected to the dongle.

A photograph processing device detects a dongle only when its power is on. Therefore, it works without restriction of functions in the case that a dongle is detached after power is already on. Then, another photographing device also can operate without restriction of its functions in the case that a detached dongle is attached to another photograph processing device when its power is on.

SUMMARY OF THE INVENTION

An object of the present invention is to provide a protection device, protection software, and a protection method that can protect against unauthorized use of an external device.

According to the present invention, there is provided a protection device controlling an external device. The external device operates with operation modes that include a user mode that is used when the external device is operated by a user, and a manufacturer mode that is used when the external device is operated by someone other than the user. The protection device comprises a mode detector that detects an operation mode of the external device, security data that is input to the protection device, a data detector that detects input of the security data, and a controller that restricts certain functions of the external device when the data detector does not detect input of the security data while the external device is in the manufacturer mode.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
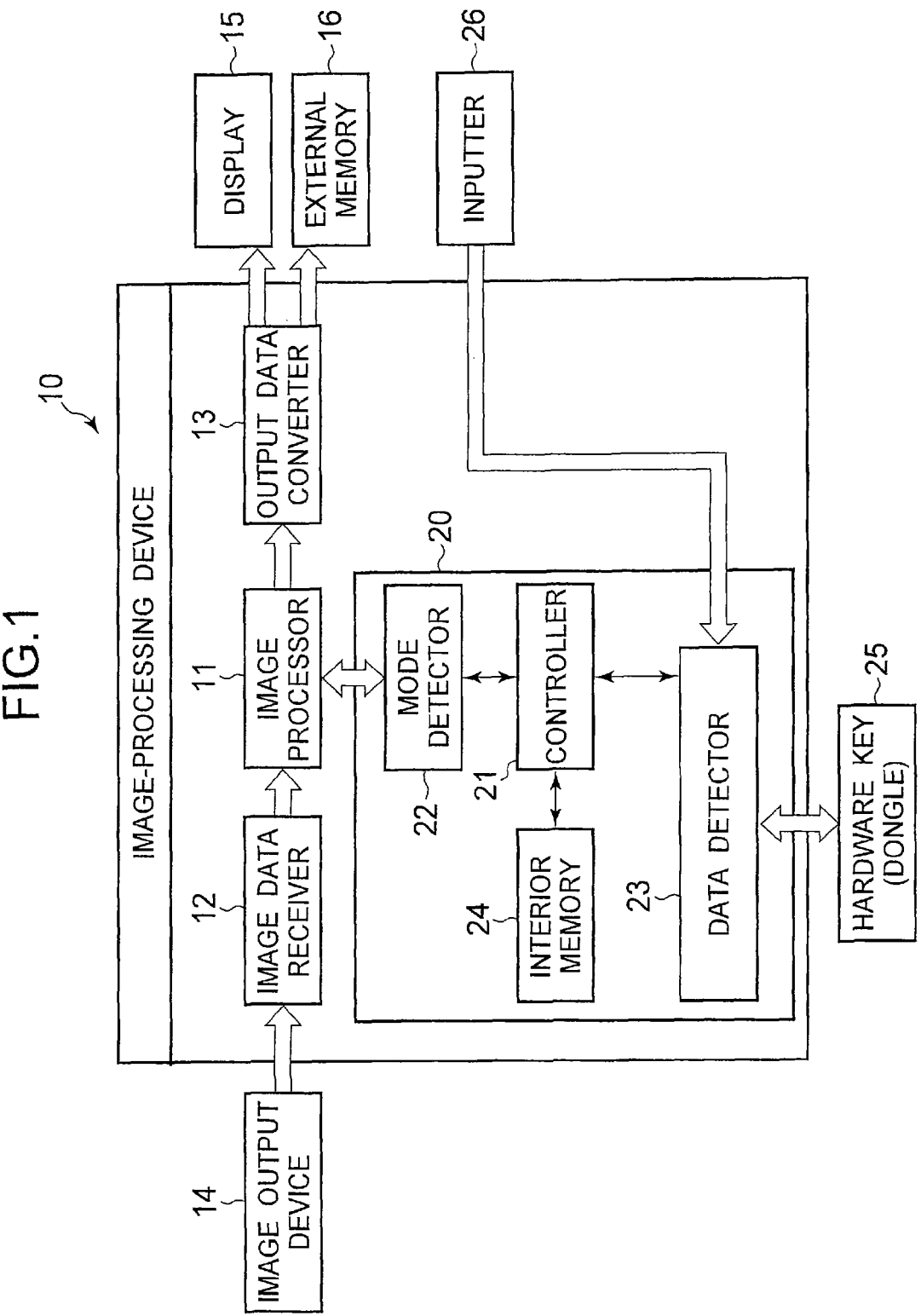
FIG. 1 is a block diagram showing the first protection device as an embodiment of the present invention.

The present invention is described below with reference to the embodiments shown in the drawings. FIG. 1 is a block diagram showing an image-processing device 10 which has a protection device 20 that applies to the embodiment of the present invention.

The image-processing device 10, which mainly comprises an image processor 11, an image data receiver 12, an output data converter 13, and the protection device 20, connects to an image output device 14 that photographs an object and outputs image data, a display 15 that displays an image, and an external memory 16 that comprises a printer or a USB memory. The image processor 11, the image data receiver 12, and the output data converter 13 are external devices that connect to the protection device 20.

The image data receiver 12 connects to the image output device 14 and receives image data from the image output device 14. The image processor 11 receives image data from the image data receiver 12, processes the received image data, and then sends the processed image data to the output data converter 13. The output data converter 13 connects to the display 15 and the external memory 16, receives image data from the image processor 11, converts the received image data to a signal format according to a receiver, and then outputs the converted image data.

The image-processing device 10 performs only functions that are authorized by a contract between a user and a manufacturer. The functions authorized by a contract are contracted functions. The contracted functions are stored in the protection device 20. The protection device 20 controls the image-processing device 10 within the contracted functions.

The image-processing device 10 comprises multiple operation modes that define the operation of the image processor 11. The operation modes comprise a user mode that is used when the image-processing device 10 is operated by a user, and a manufacturer mode that is used for maintenance of the image-processing device 10 when the image-processing device 10 is operated by a maintenance worker. The image-processing device 10 changes the operation mode from the user mode to the manufacturer mode when a certain operation, for example the input of a password, is processed. A maintenance worker operates the image-processing device 10 when it is in the manufacturer mode, so as to provide maintenance, repairs, or to reconfigure it. Thereby, the functions of the image-processing device 10 may be either partially restricted or fully available. A user does not know the password, and therefore cannot use the image-processing device 10 in the manufacturer mode because the image-processing device 10 shifts to the manufacturer mode only when a certain operation is processed, for example when a password is input.

The user mode is described hereinafter. The user mode comprises a connected mode and a disconnected mode. The difference between them is in the restriction of certain contracted functions. The protection device 20 controls the image-processing device 10 within the contracted functions when the image-processing device 10 is in the connected mode. Otherwise, the protection device 20 controls the image-processing device 10 within a narrower range of functions than the contracted functions when the image-processing device 10 is in the disconnected mode. Therefore, the functions of the image-processing device 10 are restricted relative to the complete set of contracted functions. Note that the image processor 11 carries out a standard image process that processes an input image according to a user's instructions whenever the image-processing device 10 is in the connected mode or the disconnected mode. For example, in the case that the image output device 14 is an endoscope and the image-processing device 10 is an endoscope processor, the image processor 11 processes an image so as to emphasize blood vessels and lesions.

The protection device 20 mainly comprises a controller 21, a mode detector 22, a data detector 23, and interior memory 24; it connects to a hardware key 25 that is a dongle storing security data and an inputter 26 that comprises a keyboard.

The data detector 23 connects to the hardware key 25 and inputter 26, for example with a USB connection, and reads and detects security data that is stored in the hardware key 25. The mode detector 22 connects to the image processor 11, and detects the present operation mode of the image processor 11. The controller 21 receives the present operation mode from the mode detector 22 and security data from the data detector 23. Then, it determines an appropriate operation mode for the image-processing device 10 based on the received operation mode and security data. A mode signal that includes the determined operation mode is sent to the image processor 11. The image processor 11 operates according to the received mode signal. The interior memory 24 connects to the controller 21, and stores data that is used for the process of the controller 21.

The operation of the data detector 23 is further described hereinafter. The data detector 23 determines whether or not the security data conforms to requirements that are preliminarily stored, regardless of whether the image-processing device 10 is in the user mode or the manufacturer mode. It determines that security data is detected in the case that the hardware key 25 that connects to the data detector 23 has security data that conforms to the requirements. Otherwise, it determines that security data is not detected in the case that the security data does not conform to the requirements, that the hardware key 25 is not connected to the data detector 23, or that the data detector 23 does not detect any security data.

The operation of the controller 21 is further described hereinafter. The controller 21 transmits a mode-indicating signal that represents the disconnected mode to the image processor 11 when the data detector 23 does not detect the security data while the image-processing device 10 is in the manufacturer mode. Thereby, the image-processing device 10 operates in the disconnected mode. The controller 21 transmits a mode-indicating signal that represents the disconnected mode to the image processor 11 when the data detector 23 detects the security data while the image-processing device 10 is in the manufacturer mode; however, the data detector does not detect the security data while the image-processing device 10 is in the user mode. Thereby, the image-processing device 10 operates in the disconnected mode.

According to the constructions, the image-processing device 10 operates within the contracted functions only when the protection device 20 is connected to the hardware key 25 that stores the appropriate security data when the image-processing device 10 is in the manufacturer mode and the user mode. In other cases, the image-processing device 10 operates with restrictions placed on certain contracted functions.

Figure 2:
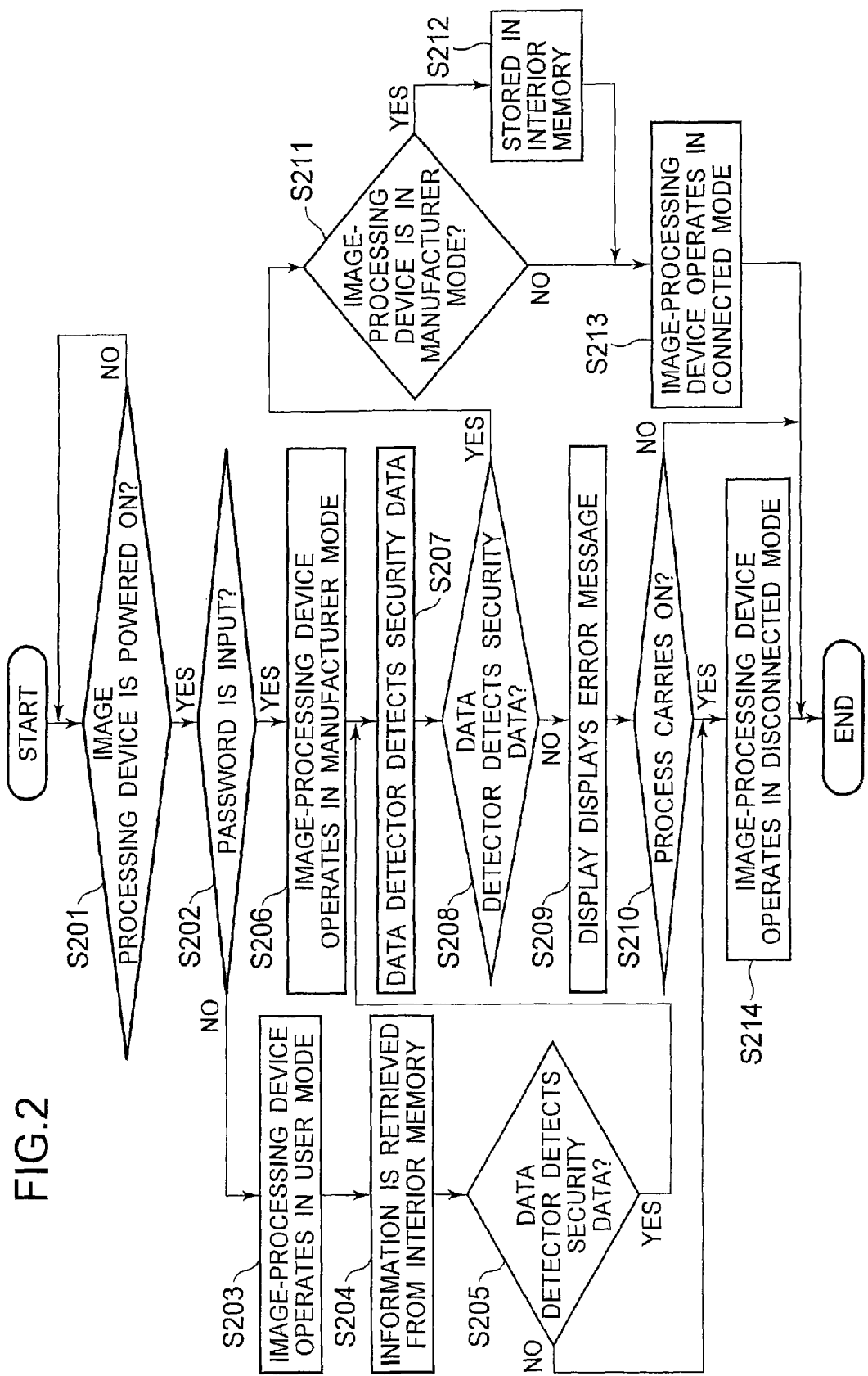
FIG. 2 is a flowchart showing a first protection process of the present invention.

With reference to FIG. 2, the first protection process is described hereinafter. The first protection process is mainly processed by the controller 21, and determines the operation mode of the image-processing device 10.

In Step S201, it is determined whether the image-processing device 10 is powered on or not. In the case that the power is on, the process proceeds to Step S202. In the case that the power is off, Step S201 is repeated until the power is on.

In Step S202, it is determined whether a certain operation, i.e. input of password, has been completed. If the certain operation has been completed, the process continues on to Step S206, otherwise, it jumps to Step S203.

In Step S206, the controller 21 transmits a mode-indicating signal that represents the manufacturer mode to the image processor 11. Thereby, the image-processing device 10 operates in the manufacturer mode. Then, the process proceeds to Step S207.

In Step S203, the controller 21 transmits a mode-indicating signal that represents the user mode to the image processor 11. Thereby, the image-processing device 10 operates in the user mode.

In the next Step S204, information that represents whether or not the security data is detected is retrieved from the interior memory 24. Then, in the next Step S205, it is determined whether the data detector 23 detects the security data when the image-processing device 10 is in the manufacturer mode based on the retrieved data in Step S204. In the case that the security data is not detected, the process proceeds to Step S214 and the controller 21 transmits a mode-indicating signal that represents the disconnected mode to the image processor 11. Thereby, the image-processing device 10 operates in the disconnected mode. In the case that the security data is detected, the process continues on to Step S207.

In Step S207, the data detector 23 detects the security data. In the next Step S208, it is determined whether the security data was detected by the data detector 23 in Step S207. In the case that the security data was not detected, the process continues on to Step S209, otherwise, the process proceeds to Step S211.

In Step S209, the display 15 displays a message that the security data has not been detected. In this case, the display 15 displays the appropriate message according to whether the security data does not conform, the hardware key 25 is not connected to the data detector 23, or the data detector 23 does not detect the security data.

In the next Step S210, a user is referred to in order to determine whether or not the process continues. In particular, the display 15 displays a message questioning whether or not the process should continue, and a user inputs a reply of yes or no via the inputter 26. In the case that the process carries on, the process proceeds to Step S214 and the controller 21 transmits a mode-indicating signal that represents the disconnected mode to the image processor 11. Thereby, the image-processing device 10 operates in the disconnected mode. In the case that the process does not carry on, it ends without Step S214 being processed.

In the case that the data detector 23 detects the security data in Step S208, the process proceeds to Step S211 where the mode detector 22 determines whether or not the image-processing device 10 is in the manufacturer mode. In the case that it is in the manufacturer mode, the process continues on to Step S212. In the case that it is not in the manufacturer mode, the process jumps to Step S213.

In Step S212, the interior memory 24 records that the security data has been detected when the image-processing device 10 is in the manufacturer mode. Then, the process proceeds to Step S213.

In Step S213, the controller 21 transmits a mode-indicating signal that represents the connected mode to the image processor 11. Thereby, the image-processing device 10 operates in the connected mode. Then, the process ends.

According to the embodiment, the image-processing device 10 does not operate properly if the hardware key 25 is inserted only when the image-processing device 10 is powered on. Thereby, it is prohibited to use the external device without authorization.

Note that the contracted functions may be changed based on the security data. The function of the image-processing device 10 can be easily changed, but only by changing the security data. This is useful for when the contract between a user and a manufacturer is changed so that the contracted functions can be changed after the image-processing device is shipped from a factory.

The second embodiment is described hereinafter with reference to FIGS. 1 and 3. The constructions of the second embodiment that are similar to the first embodiment have the same reference numbers applied and their descriptions have been omitted. The second embodiment differs from the first embodiment in that a password is used instead of the hardware key 25.

The data detector 23 reads and detects a password that is input with the inputter 26. The controller 21 receives the password from the data detector 23. Then, it determines an operation mode of the image-processing device 10 based on the received operation mode and password.

The operation of the data detector 23 is further described hereinafter. The data detector 23 determines whether or not the password conforms to a requirement that is preliminarily stored regardless of whether the image-processing device 10 is in the user mode or the manufacturer mode. It determines that security data is detected in the case that the input password conforms to the requirement. Otherwise, the data detector 23 determines that security data is not detected when the password does not conform to the requirement, that the password has not been input, and that the data detector 23 does not detect the password.

According to the constructions, the image-processing device 10 operates within the contracted functions only in the case that the password is input to the appropriate protection device 20 when the image-processing device 10 is in either the manufacturer mode or the user mode. In other cases, the image-processing device 10 operates with restrictions placed on certain contracted functions.

Figure 3:
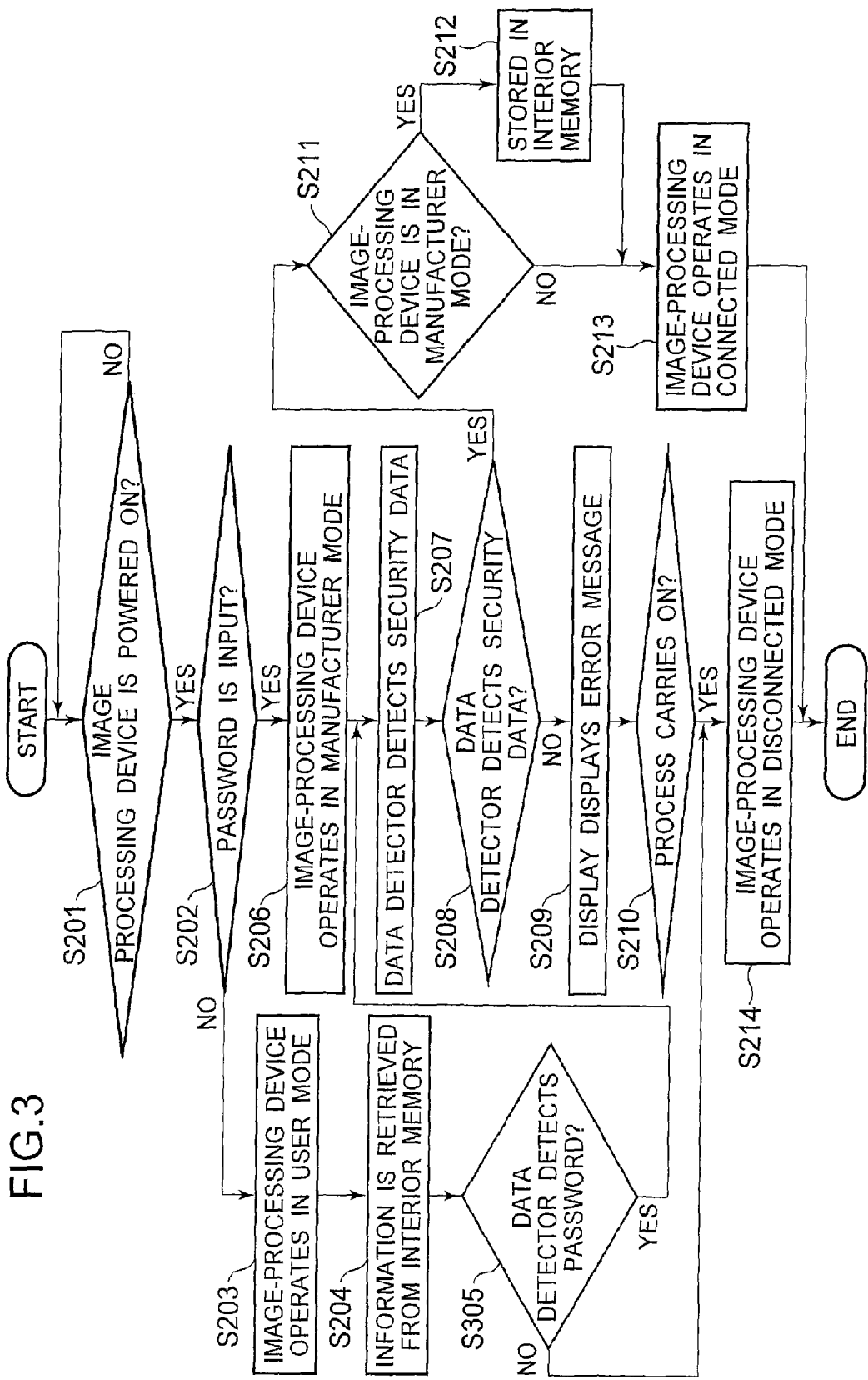
FIG. 3 is a flowchart showing a second protection process of the present invention.

With reference to FIG. 3, the second protection process is described hereinafter. The second protection process is mainly carried out by the controller 21, and determines the operation mode of the image-processing device 10. The second protection process differs from the first protection process in that the input of a password is detected instead of the connection of the hardware key 25.

The processes of Steps S201-S204 and S206-S214 are not described because they are the same as those of the first protection process. In the next Step S305, it is determined whether the data detector 23 detects the password when the image-processing device 10 is in the manufacturer mode, based on the data retrieved in Step S204. In the case that the security data is not detected, the process proceeds to Step S214 and the controller 21 transmits a mode-indicating signal that represents the disconnected mode to the image processor 11. Thereby, the image-processing device 10 operates in the disconnected mode. In the case that the security data is detected, the process continues on to Step S207.

The second embodiment produces the same effect as the first embodiment by using a password in the case that an image-processing device does not have the hardware key 25.

Note that the inputter 26 is not limited to a keyboard, and may be another input device such as a mouse, tablet, or ten-key.

The data detector 23 may connect to the hardware key 25 and the inputter 26 instead of the USB connection.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2011-120911 (filed on May 30, 2011), which is expressly incorporated herein, by reference, in its entirety.

The invention claimed is:

1. A protection device controlling an external device, the external device operates with operation modes that include a user mode and a manufacturer mode, the protection device comprising:
   a mode detector that detects whether the external device is currently in the user mode or the manufacturer mode by detecting input of a password, the external device being operated by a user in the user mode, and being operated by a non-user in the manufacturer mode, the non-user performing at least one of maintenance, repair and reconfiguration of the external device, the user mode and the manufacturer mode being switched by detecting input of the password;
   a data detector that detects whether or not security data is input to the protection device; and
   a controller configured such that, when the mode detector detects that the external device is currently in the manufacturer mode, and when said data detector does not detect an input of the security data, the controller restricts at least one function of the external device in the manufacturer mode, and
   when the mode detector detects that the external device is currently in the manufacturer mode, and when said data detector detects an input of the security data, an internal memory of the protection device stores information indicating that the security data is detected in the manufacturer mode, and
   when said mode detector detects that the external device is currently in the user mode, the controller retrieves the information stored in the internal memory, and determines, based on the retrieved information, whether or not said data detector has detected the input of the security data while the external device was previously in the manufacturing mode, and
   while the external device is currently in the user mode, in response to a determination that said data detector has detected the input of the security data while the external device was previously in the manufacturing mode, the controller further determines whether or not said data detector detects the input of the security data, and
   while the external device is currently in the user mode, in response to said data detector not detecting the input of the security data, said controller restricts the at least one function of the external device in the current user mode,
   wherein the mode detector and the controller comprise a processor that executes instructions stored in a memory.

2. The protection device according to claim 1, wherein, while the external device is currently in the user mode, said controller does not restrict any functions of the external device in the current user mode, when it is determined that said data detector has detected the input of the security data while the external device was previously in the manufacturer mode and when said data detector detects the input of the security data while the external device is currently in the user mode.

3. The protection device according to claim 1, further comprising a key that stores the security data and is detachable from said data detector,
   wherein said data detector detects the security data that is stored in said key that is attached to said data detector while the external device is in either the manufacturer mode or the user mode.

4. The protection device according to claim 1, further comprising a key that stores the security data and is detachable from said data detector;
- wherein said data detector detects the security data that is stored in said key that is attached to said data detector while the external device is in the manufacturer mode or the user mode; and
- wherein, while the external device is currently in the user mode, said controller restricts the at least one function of the external device, in response to a determination that said data detector has detected the input of the security data while the external device was previously in the manufacturer mode, and in response to said data detector not detecting the input of the security data while the external device is currently in the user mode.

5. The protection device according to claim 1, further comprising a key that stores the security data and is detachable from said data detector;
- wherein said data detector detects the security data that is stored in said key that is attached to said data detector while the external device is in the manufacturer mode or the user mode; and
- wherein, when the external device is currently in the user mode, said controller does not restrict any function of the external device, in response to a determination that said data detector has detected the input of security data while the external device was previously in the manufacturer mode, and in response to said data detector detecting the input of the security data while the external device is currently in the user mode.

6. The protection device according to claim 1, further comprising an inputter that inputs the security data to said data detector, wherein the security data comprises a password.

7. The protection device according to claim 1, wherein the controller does not restrict any functions of the external device in the current manufacturer mode, when said data detector detects the input of the security data while the external device is currently in the manufacturer mode.

8. The protection device according to claim 1, wherein, while the external device is currently in the user mode,
- when it is determined that said data detector has not detected the input of the security data while the external device was previously in the manufacturer mode, the controller restricts the at least one function of the external device in the current user mode regardless of whether or not said data detector detects the input of the security data while the external device is currently in the user mode.

9. The protection device according to claim 1, wherein the external device is configured to operate a plurality of functions both in the user mode and in the manufacturer mode, and
- the at least one function restricted by the controller is at least one of the plurality of functions that can be operated both in the user mode and the manufacturer mode.

10. The protection device according to claim 9, wherein the plurality of functions are contracted functions.

11. One or more non-transitory tangible media having computer-executable instructions for controlling an external device, the external device having operation modes that include a user mode and a manufacturer mode, the computer-executable instructions causing a computer to perform operations comprising:
- detecting whether the external device is currently in the user mode or the manufacturer mode by detecting input of a password, the external device being operated by a user in the user mode, and being operated by a non-user in the manufacturer mode, the non-user performing at least one of maintenance, repair and reconfiguration of the external device, the user mode and the manufacturer mode being switched by detecting input of the password;
- detecting, after detecting that the external device is currently in the manufacturer mode, whether or not security data is input while the external device is currently in the manufacturer mode;
- storing, in a memory, information indicating that the security data is detected in the manufacturer mode, when it is detected that the external device is currently in the manufacturer mode, and when the input of the security data is detected in the current manufacturer mode;
- restricting at least one function of the external device in the current manufacturing mode, when the input of the security data is not detected while the external device is currently in the manufacturer mode;
- determining, after detecting that the external device is currently in the user mode, whether the input of the security data was detected while the external device was previously in the manufacturer mode, by retrieving the information stored in the memory and based on the retrieved information;
- determining, in response to detecting the input of the security data while the external device was previously in the manufacturer mode, whether or not an input of security data is detected while the external device is currently in the user mode; and
- restricting, in response to not detecting the input of the security data while the external device is currently in the user mode, the at least one function of the external device in the current user mode.

12. A protection method for controlling an external device, the external device including operation modes that include a user mode and a manufacturer mode, the method comprising:
- detecting whether the external device is currently in the user mode or the manufacturer mode by detecting input of a password, the external device being operated by a user in the user mode, and being operated by a non-user in the manufacturer mode, the non-user performing at least one of maintenance, repair and reconfiguration of the external device, the user mode and the manufacturer mode being switched by detecting input of the password;
- detecting, after detecting that the external device is currently in the manufacturer mode, whether or not security data is input while the external device is currently in the manufacturer mode;
- storing, in a memory, information indicating that the security data is detected in the manufacturer mode, when it is detected that the external device is currently in the manufacturer mode, and when the input of the security data is detected in the current manufacturer mode;
- restricting at least one function of the external device in the current manufacturing mode, when the input of the security data is not detected while the external device is currently in the manufacturer mode;
- determining, after detecting that the external device is currently in the user mode, whether the input of the security data was detected while the external device was previously in the manufacturer mode, by retrieving the information stored in the memory and based on the retrieved information;
- determining, in response to detecting the input of the security data while the external device was previously in the manufacturer mode, whether or not an input of security data is detected while the external device is currently in the user mode; and restricting, in response to not detecting the input of the security data while the external device is currently in the user mode, the at least one function of the external device in the current user mode.

\* \* \* \* \*